(12) United States Patent
Tyler

(10) Patent No.: US 8,580,114 B2
(45) Date of Patent: Nov. 12, 2013

(54) PROCESSES FOR REMEDIATION OF CONTAMINANT PLUMES

(75) Inventor: Edward Kenneth Tyler, Gilbert, AZ (US)

(73) Assignee: Kleinfelder West, Inc., San Diego, CA (US)

( * ) Notice: Subject to any disclaimer, the term of this patent is extended or adjusted under 35 U.S.C. 154(b) by 327 days.

(21) Appl. No.: 13/134,767

(22) Filed: Jun. 16, 2011

(65) Prior Publication Data

US 2012/0318747 A1 Dec. 20, 2012

(51) Int. Cl.
| C02F 3/00 | (2006.01) |
| B09C 1/08 | (2006.01) |
| B09C 1/10 | (2006.01) |
| B09C 1/00 | (2006.01) |
| C02F 1/70 | (2006.01) |
| C02F 1/72 | (2006.01) |

(52) U.S. Cl.
CPC . *C02F 3/00* (2013.01); *B09C 1/002* (2013.01); *B09C 1/08* (2013.01); *B09C 1/10* (2013.01); *C02F 1/705* (2013.01); *C02F 1/72* (2013.01)
USPC ...................... 210/610; 210/747.7; 210/747.8; 210/170.07; 405/128.7; 405/128.75; 405/129.2; 405/129.25

(58) Field of Classification Search
USPC ....................... 210/610, 747.7, 747.8, 170.07; 405/128.45, 128.5, 128.7, 128.75, 405/129.2, 129.25; 166/267
See application file for complete search history.

(56) References Cited

U.S. PATENT DOCUMENTS

| 4,401,569 | A | * | 8/1983 | Jhaveri et al. .................. 210/610 |
| 4,576,717 | A | * | 3/1986 | Collin et al. ................... 210/610 |
| 4,600,508 | A | * | 7/1986 | DeGhetto ................. 210/170.07 |
| 4,755,304 | A | | 7/1988 | Hallbert et al. |
| 4,892,664 | A | * | 1/1990 | Miller ......................... 210/747.8 |
| 4,992,174 | A | * | 2/1991 | Caplan et al. .................. 210/610 |
| 5,000,858 | A | * | 3/1991 | Manning et al. ........... 210/747.8 |
| 5,006,250 | A | | 4/1991 | Roberts et al. |
| 5,279,740 | A | | 1/1994 | Basile et al. |
| 5,730,550 | A | | 3/1998 | Andersland et al. |
| 6,165,356 | A | * | 12/2000 | Carman et al. ........... 210/170.07 |
| 6,210,073 | B1 | | 4/2001 | Buehlman et al. |
| 6,254,785 | B1 | | 7/2001 | Phifer et al. |
| 6,398,960 | B1 | * | 6/2002 | Borden et al. ................. 210/610 |
| 6,503,395 | B1 | * | 1/2003 | Salanitro et al. ........... 210/747.7 |
| 6,719,904 | B2 | * | 4/2004 | Schindler ................... 210/747.7 |
| 6,758,979 | B1 | | 7/2004 | Weiss et al. |
| 6,984,316 | B2 | | 1/2006 | Tanenberg |
| 7,407,583 | B2 | | 8/2008 | Mailath et al. |
| 7,438,814 | B2 | | 10/2008 | Hallberg |

* cited by examiner

*Primary Examiner* — Christopher Upton
(74) *Attorney, Agent, or Firm* — Adams Law Office; Sharon Adams

(57) ABSTRACT

When a large-scale contaminant plume is located under a surface area with conditions that prevent placement of a network of injection and associated extraction wells, embodiments of the invention may be used to pump a specific volume of the contaminant plume to at least one remote in-situ treatment cell, comprising at least one injection well surrounded by a plurality of associated extraction wells, where each extraction well is less than 300 feet from the associated injection well, and has a treatment zone with treatment reagent between injection and associated extraction wells.

17 Claims, 4 Drawing Sheets

PROCESSES FOR REMEDIATION OF CONTAMINANT PLUMES

CROSS REFERENCE TO RELATED APPLICATION

Not applicable.

STATEMENT REGARDING FEDERALLY SPONSORED RESEARCH

Not applicable.

NAMES OF THE PARTIES TO A JOINT RESEARCH AGREEMENT

Not applicable.

BACKGROUND OF THE INVENTION

1. Field of the Invention

The invention relates to removal and treatment of dissolved phase contaminant plumes from groundwater, and in particular the treatment of large-scale groundwater plumes.

2. Description of the Related Art

A contaminant plume comprises a head, the source of the contamination; a tail, the down-gradient end of the contamination; and a body, the dissolved phase contamination between the source area and the leading edge of the plume.

Common approaches to treating or managing a contaminant plume in groundwater focus on treatment or management of the head or the tail of the plume.

Other existing systems treat or manage the body of the plume. These existing systems generally entail some form of containment accomplished through groundwater pumping, to prevent the contaminant plume from migrating further down-gradient.

Some existing systems for treating the body of the plume use biological and/or chemical treatments, and generally endeavor to either bring the plume to a reagent, or deliver reagent to the plume. Approaches to bring the contaminated water to the reagent typically involve either pumping, amending (e.g., mixing with reagent), and reinjecting; or pumping with some form of ex-situ treatment.

Approaches to deliver the reagent to the plume typically involve: 1) direct injection in a grid pattern over the area of the plume; 2) placement of reagent in a trench or injecting less mobile reagent (e.g., emplacement of low solubility (slow release) substrate, zero valent iron, etc.) transverse to the plume at the down-gradient edge (i.e., a permeable reactive barrier); 3) injection of soluble reagent (i.e., soluble substrate, etc.); or 4) some form of recirculation.

For large plumes, some form of recirculation is generally required to facilitate delivery of the treatment reagent over increasingly large distances. Recirculation may be accomplished longitudinally through delivery of reagent in a recirculation pattern in line with the direction of groundwater advection, or in a transverse pattern through delivery of reagent in a recirculation pattern perpendicular with the direction of groundwater advection.

Existing recirculation systems require a network of injection and extraction wells throughout the entire surface area above the contaminant plume. The spacing between injection and extraction wells is dependent on the ability to establish an engineered hydraulic gradient that results from the combined groundwater mounding (around injection wells) and groundwater drawdown (around extraction wells). Under the best hydrogeologic conditions, existing recirculation systems have a maximum distance of 200 to 300 feet between injection and associated extraction wells. At distances greater than these, recirculation does not adequately decontaminate a plume.

It may be impractical or impossible to locate extraction wells at distances of less than 300 feet from the associated injection well, for example, a large contaminant plume may be under a surface area that may have commercial structures, roads, homes or other existing infrastructure that prevents or interferes with placement of injection and extraction wells at distances less than 300 feet.

Recirculation can also be technically impractical because the natural hydraulic gradient at a site may overcome the attempted recirculation. Large plumes continue to move over time, and existing methods cannot treat large water volumes rapidly enough to overcome the natural water movement. In other instances, the length of time needed to complete the recirculation is too long to be practical.

Other existing systems rely on a natural hydraulic gradient to cause the needed flow for water treatment, Some existing systems use a biological reagent to treat or decontaminate the water, for example, systems where extracted contaminated water is mixed with a biological reagent and then reinjected. These systems are subject to biofouling.

Biofouling occurs when bacteria attach, grow and block the equipment, piping well screen, filter pack or formation surrounding a nutrient delivery well, thereby limiting or preventing the proper function of the process piping, equipment, or wells. The bacteria may originate in the aquifer itself, or may be introduced during reagent addition, or groundwater recirculation. Most groundwater environments contain an active and diverse microbial population, but growth is limited until substrate is introduced.

Upon introduction of substrate to support bioremediation, biological waste may accumulate from the enhancement of indigenous bacteria. Biofouling will often accumulate and restrict pipes, pumps or other apparatus that come in contact with the contaminated water and treatment bacteria.

As plume areas increases in size the surface area that is above a contaminated plume also increases in size, and existing surface conditions may interfere the placement of treatment wells. Existing systems are inefficient or ineffective for the treatment or management of large-scale plumes. Computer modeling showed that existing pump and treat, or recirculation systems failed to effectively treat large-scale contaminant plumes, due to cost, the natural hydraulic gradient or other factors.

BRIEF SUMMARY OF THE INVENTION

Embodiments of invention are directed to systems for treating large-scale dissolved-phase contaminant plumes, although the invention is not limited to large-scale plumes.

As used in this specification, a "large scale plume" is a plume where it is impossible or difficult to locate extractions wells at distances less than 300 feet from an associated injection well. It may be impossible or difficult to create the needed grid-like network of associated injection and extraction wells at distances of less than 300 feet due to surface conditions, including infrastructure or geologic conditions, or existing hydraulic gradient at the plume, subsurface soil conditions, or any other factor.

In an embodiment of the invention, contaminated water is pumped from a large-scale plume via at least one pumping well installed in an accessible location in surface area 12, and transported to at least one remote in-situ treatment cell 20.

Contaminated groundwater is pumped from the plume, to the remote treatment cell, allowing the treatment cell to be located without regard to any hydraulic gradient between the plume and the treatment cell location. Embodiments of the invention permit placement of the treatment cell in locations that may be more desirable or convenient, for example, in an area with a shallow water table, or in an open area with space for extraction and injection wells. Other embodiments locate the treatment cell within the contaminant plume.

The pumping well pumps at least the entire contaminated pore volume of the plume, or a pore volume representative of the higher concentration portions of the plume thus relying on natural attenuation for the remaining unpumped lower concentration portions of the plume. In one embodiment, at least one pumping well is located in the contaminant plume. Each pumping well has a bottom end in hydraulic connection with the plume and a top end in a surface area above the plume. The contaminated groundwater is pumped from a pumping well to at least one previously-prepared treatment cell.

In one embodiment, the treatment cell 20 is located remotely from the plume, and comprises at least one injection well surrounded by a plurality of extraction wells, where each extraction well is less than 300 feet from the injection well, and where all well bottoms are in hydraulic connection with a local water table. The relative locations of the injection and extraction wells are determined through engineering and computer modeling techniques, so that the contaminated water flows from each injection well through a treatment zone in a single pass, to a plurality of extraction wells at distances of less than 300 feet from the associated injection well.

In one embodiment, the treatment zone comprises long-term reagent emplaced in the soil. The long-term reagent may be biological or chemical means for treating contaminated water. In one embodiment, the treatment zone is annular, and surrounds the injection well outlet. In other embodiments the treatment zone may have a different shape, and/or may have only one extraction well for each injection well. The ground surface area of treatment cell 20 is smaller than ground surface area above the contaminated plume.

The treated water is withdrawn from the extraction wells using pumps, and disposed of through infiltration wells, or other means as appropriate.

The pumping rates of the pumping and extraction wells are determined using engineering and computer modeling techniques so that one pore volume is pumped and treated in a reasonable time, as determined by economic, climate, geographic, or other conditions.

DESCRIPTION OF THE SEVERAL VIEWS

DETAILED DESCRIPTION

The invention comprises a system for treating contaminated subsurface ground water. A plume of contaminated water is necessarily under a surface area 12 on the earth.

In one embodiment of the invention, a contaminated plume 10 is located underneath surface area 12 with existing surface conditions that interferes with or prevent with placement of pumping, injection and/or extraction wells. Non-limiting examples of such existing surface conditions are existing infrastructure, such as commercial or residential buildings, roads, power lines, or geological conditions such as mountains and rocks. In other situations, a contaminated plume is located underneath surface area 12 that makes the placement of wells difficult because of existing hydraulic gradients, water table depth, or any other condition where placing a multitude of wells at distances of less than 300 feet between the wells is impractical or impossible.

According to an embodiment of the invention, after identifying a dissolved-phase contaminant plume 10 in need of remediation, at least one, three-dimensional, in-situ treatment cell 20 is prepared. The untreated water is pumped from plume 10, using a pumping well 30, to treatment cell 20 for treatment.

Figure 1:
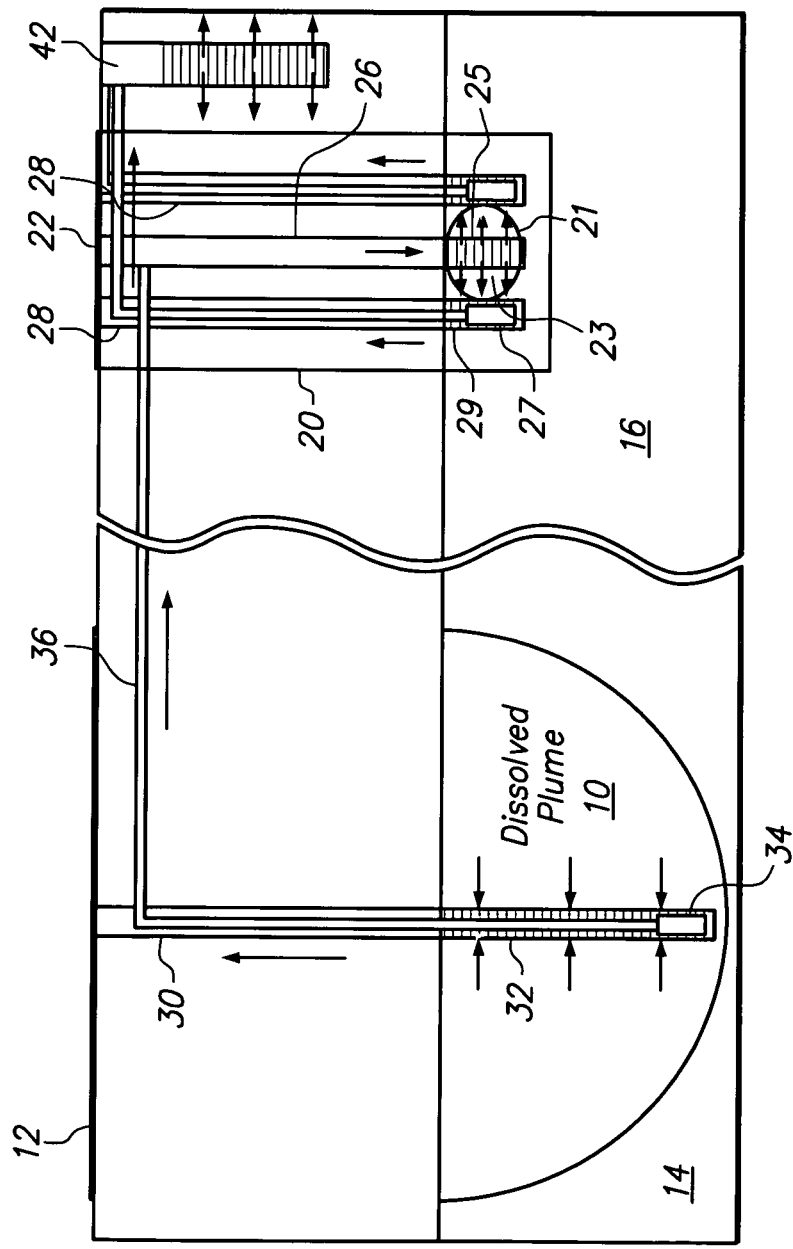
FIG. 1 is cross sectional side view, not to scale, of a first embodiment of the invention.

As shown in FIG. 1, at least one pumping well 30 is inserted in surface area 12 above contaminant plume 10. The bottom of each pumping well may be at any depth, as long as the bottom has inlet 32 in hydraulic connection with contaminant plume 10. In one embodiment inlet 32 may be a screen interval, and the screen interval is in hydraulic connection with contaminant plume 10.

Pump 34 is connected with pumping well 30. Pump 34 draws contaminated water through pumping well inlet 32, up and out the top of pumping well 30. Pumping well 30 is in hydraulic connection 36 with at least one treatment cell 20. Pipes or tubing may be used to hydraulically connect a pumping well 30 with a treatment cell 20. The contaminated water is pumped from pumping well 30 to treatment cell 20 through hydraulic connection 36.

Contaminated water is pumped, at a pre-determined rate, from the plume 10 through inlet 32 and up pumping well 30 to at least one injection well 26 at treatment cell 20. The pumping rate is set so that a specific volume is extracted from plume 10 and treated in a commercially reasonable time. The specific volume may be one pore volume, or may be another previously determined portion of the plume, for example the portion with the highest concentration of contaminant.

At least one treatment cell 20 is prepared prior to beginning the water treatment process. Treatment cell 20 may be located remote from contaminant plume 10, or may be located within the contaminant plume 10, or any combination thereof.

In instances where contaminant plume surface area 12 makes placing a plurality of wells at the required distances impractical or impossible, it may be preferable to locate treatment cell 20 remotely.

The location of treatment cell 20 is determined by convenience, considering several factors, which may include the depth of the local water table and the surface area conditions at the proposed treatment cell location. Other factors may include the distance from the contaminant plume and local soil conditions.

In one embodiment, the hydraulic gradient between contaminant plume 10 and treatment cell 20 is not a factor in locating treatment cell 20, and is irrelevant to the location of treatment cell 20. It is not necessary to have any hydraulic gradient between plume 10 and treatment cell 20 because untreated water is actively pumped to treatment cell 20. Treatment cell 20 may be located up-gradient, down-gradient, or cross-gradient from plume 10.

Treatment cell 20 is three-dimensional, with a surface area 22, at least one injection well 26, and a plurality of extraction wells 28 associated with each injection well. The distance between each injection well and each associated extraction wells is less than 300 feet. The bottom of each of injection and extraction well is in hydraulic connection with local water table 16, or local subsurface saturated zone. Treatment cell surface area 22 is determined by the boundaries of the injection and extraction wells, which also defines a width and length of three-dimensional treatment cell 20. The depth of treatment cell 20 is determined by the depth of the wells and treatment zone.

Figure 2:
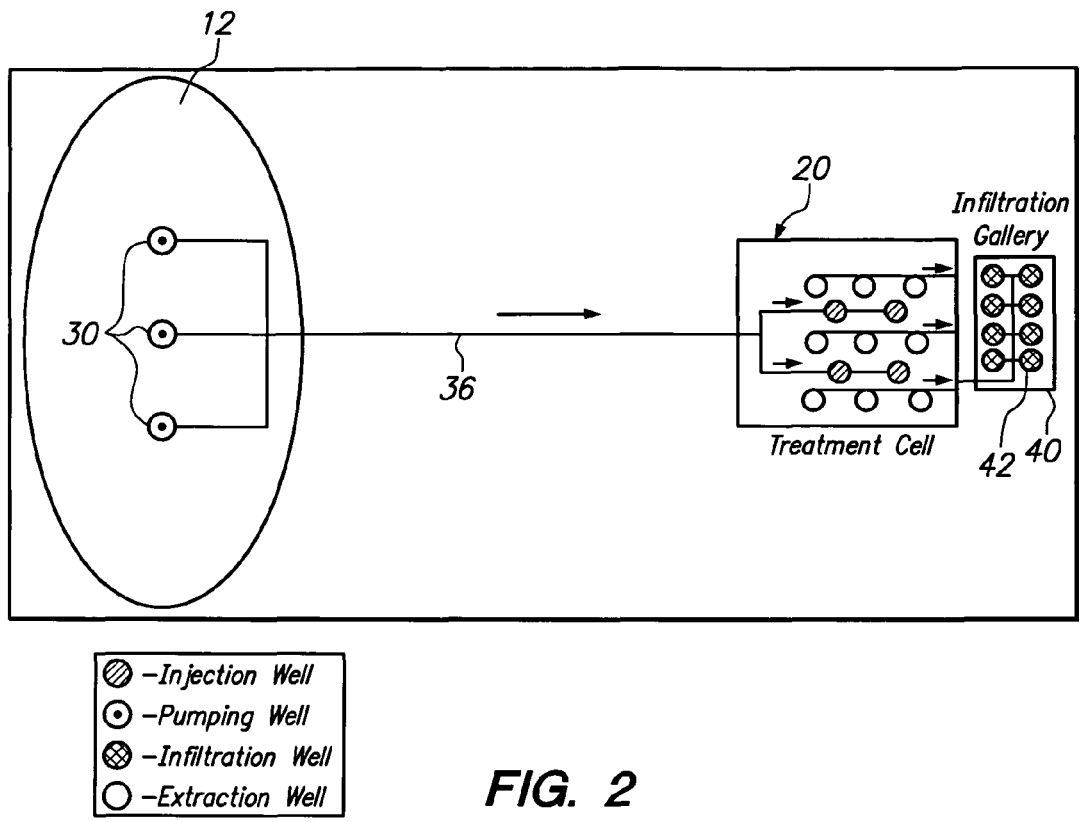
FIG. 2 is a plan view, not to scale, of a first embodiment of the invention.

As shown in FIG. 2, in one embodiment, treatment cell surface area 22 is smaller than plume surface area 12. The three-dimensional volume of treatment cell 20 is smaller than the volume of plume 10.

In another embodiment, cell surface area 22 is less than $\frac{1}{3}$ the size of plume surface area 12. In another embodiment, cell surface area 22 is less than $\frac{1}{4}$ the size of plume surface area 12.

The location and number of extraction wells 28 relative to each injection well 26 is determined using engineering and computer modeling so that the contaminated water flows in a single-pass from injection well 26, through treatment zone 21, and to the plurality of associated extraction wells 28.

Figure 4:
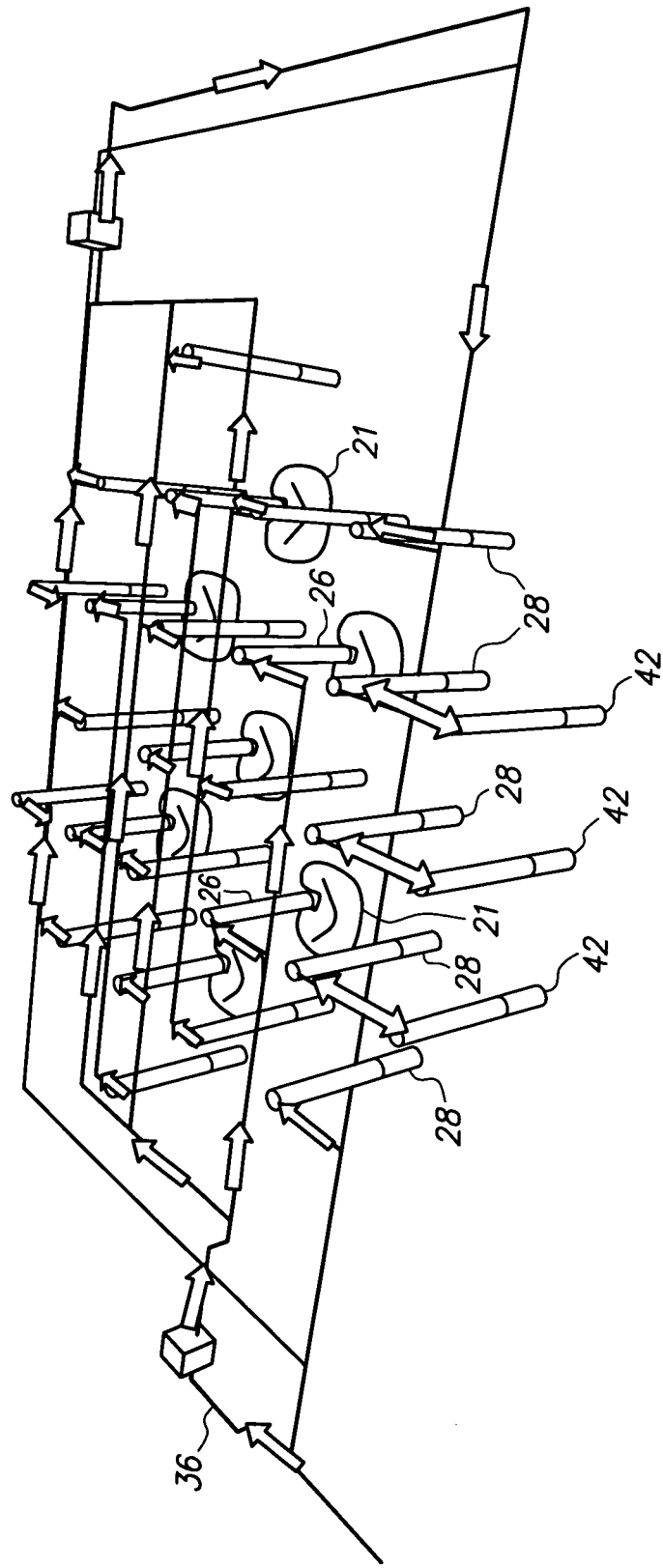
FIG. 4 is a cross sectional, perspective view of an embodiment of a treatment cell.

In one embodiment, treatment cell 20 comprises at least one injection well 26, and each injection well is surrounded by an annular treatment zone 21 and a plurality of associated extraction wells 28. In one embodiment, there is a grid-like network of injection and associated extraction wells, for example there may be four extraction wells for each injection well, located in a grid-pattern, as shown in FIG. 4.

As shown in FIG. 1, within treatment cell 20, each extraction well 28 comprises a top connected with surface area 22 and an inlet 29 in hydraulic connection with local water table 16. In some embodiments, extraction well inlet 29 may be a screen interval. In some embodiments, pump 27 is connected with extraction well 28, and actively pumps water up extraction well 28. Active pumping at extraction well 28 allows extraction wells to be located closer to each injection well than would be possible without pumping, resulting in a corresponding decrease in the size of treatment cell 20. In addition, the time needed for water to pass through the treatment zone is decreased due to active pumping at extraction well 28.

Within treatment cell 20, each injection well 26 comprises a top connected with surface area 22 and an outlet 25 in hydraulic connection with local water table 16. Each injection well top is in hydraulic connection with at least one remote pumping well. In some embodiments, the injection well outlet 25 may be a screen interval. In some embodiments, a pump is connected with injection well 26, and actively pumps water down injection well 26.

Treatment zone 21 is prepared prior to any treatment of contaminated water. Treatment zone 21 is a zone or space with treatment reagent 23. In one embodiment treatment zone 21 is created by emplacing reagent 23 at outlet 25 of injection well 26.

In some embodiments, treatment zone 21 is an annular shape surrounding outlet 25, as shown in FIGS. 1 and 4. In other embodiments, as show in FIG. 3, treatment zone 21 may be located apart from injection well 26, and may be in shapes other than annular. Treatment zone 21 may be any shape, as determined by pumping rates, or hydraulic gradient, or both.

Different decontamination reagents 23 may be used, depending on the type of groundwater contamination or other factors, as is known by those skilled in the art. As used in this specification, reagent means a biological substrate, or chemical oxidant/reductant, or any other compound for treatment of dissolved phase contaminants in a plume.

In one embodiment, a long-term reagent that lasts at least three years, and disperses slowly, is injected into the soil, forming treatment zone 21. The long-term reagent may be emulsified edible oil, where the oil adheres to the soil surrounding the injection well, providing a food source for bioremediation for at least three years. When the long-term reagent is depleted, reagent may be re-injected into the soil surrounding each injection well.

In other embodiments, the treatment zone 21 may comprise a long-term chemical reagent, as a non-limiting example, zero-valent iron. Long-term chemical reagents are emplaced in the soil surrounding an injection well, and decontaminate the water for at least three years through chemical reactions, including oxidation and reduction.

In another embodiment reagent 23 is a short-term biological or chemical decontaminant that lasts for less than three years. Short-term reagents may be reinjected during treatment processing.

The untreated, contaminated groundwater flows out outlet 25 of injection well 26, through treatment zone 21, to the surrounding associated extraction wells 28. Reagent 23 treats the water as it passes through treatment zone 21.

In some embodiments, water may be actively pumped through the treatment zone 21. In one embodiment, each extraction well 28 is connected with pump 27, to pump the water from the bottom inlet 29 of extraction well 28, up the extraction well, and out of treatment cell 20. In this embodiment, pump 27 actively draws water through treatment zone 21 for single-pass treatment of contaminated water, while also allowing each extraction well to be located less than 300 feet from the associated injection well. When the treatment zone reagent 23 is intended to enhance bioremediation, it may be preferable to treat contaminated water, using a single-pass through treatment zone 21, as this eliminates or greatly reduces bio-fouling that may result from recirculating the extracted treated groundwater (containing unused reagent) with untreated groundwater back through the treatment cell.

The pumping rates are set so that, taking into account existing soil conditions, hydraulic gradients and other factors, the contaminated water will flow through treatment zone 21 before being extracted at extraction well 28.

In another embodiment, the flow rate through the treatment zone is determined by a pump connected with an injection well 25.

The direction of the water flow may be regulated by adjusting the pumping rates of the various wells. Thus, the shape and/or location of treatment zone 21 may be modified by adjusting pumping rates.

After passing through the treatment zone, the treated water is withdrawn from a plurality of extraction wells 28. In one embodiment, the extraction wells are located relative to each injection well to create a radial water flow pattern from the injection well, through an annular treatment zone, to the extraction wells, as shown in FIG. 4.

In other embodiments, the pumping rates of the extraction wells may be adjusted to direct contaminated water through treatment zones in shapes other than annular, as a non-limiting example, a cone shape.

Figure 3:
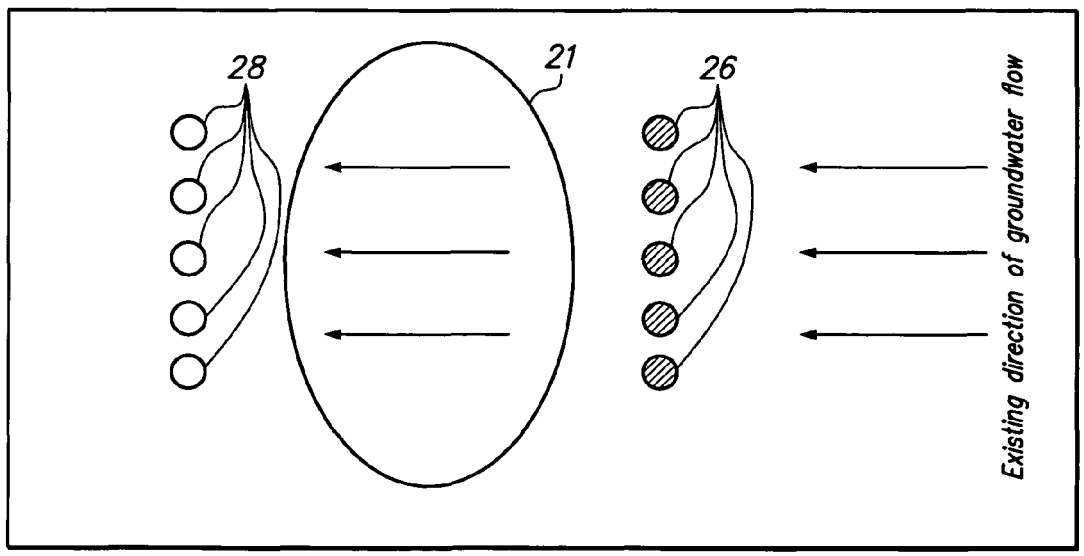
FIG. 3 is a plan view, not to scale, of an embodiment of the invention.
Figure 5:
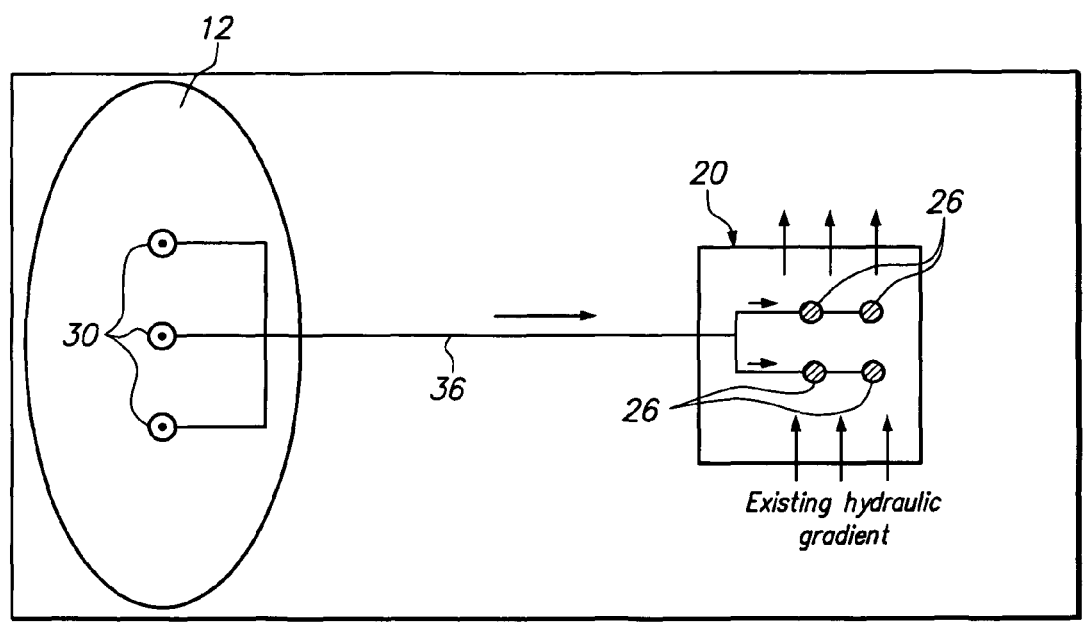
FIG. 5 is a plan view, not to scale, of an embodiment of the invention.

In other embodiments of the invention, as shown in FIG. 5, treatment cell 20 is located remote from contaminant plume, at a location where there is a natural hydraulic gradient. The remote treatment cell has at least one injection well 26. Reagent 23 may be emplaced in any desired shape around or near injection well 26, forming treatment zone 21. The shape of the treatment zone is determined using standard engineering and computer modeling techniques, so that, based on the local natural hydraulic gradient, the contaminated water flows in a single pass through the treatment zone. In some embodiments, as shown in FIG. 5, no extraction wells are needed, and the treated water simply rejoins the local water table. In other embodiments, as shown in FIG. 3, extraction wells 28 may actively pump treated water from non-annular treatment zone 21.

The treated water is disposed of by means known to those skilled in the art, and may include an infiltration gallery 40 with at least one infiltration well 42, as shown in FIG. 2, or returning the treated water to the original area that was contaminated, or any other method of disposed of treated water. The treatment process continues until the specific volume is withdrawn from the plume and treated in treatment cell 20.

The invention may be embodied in other specific forms without departing from the spirit or essential characteristics thereof. The embodiments disclosed in this specification are to be considered in all respects as illustrative and not restrictive, and all changes that come within the meaning and range of equivalency of the claims are intended to be embraced therein.

A recitation of "a" "an" or "the" is intended to mean "one or more" unless specifically indicated to the contrary.

What is claimed is:

1. A method for treating a large-scale contaminant plume under a surface area when surface conditions above said plume interfere with placement of a plurality of pumps at distances of less than 300 feet, wherein the improvement comprises:
   (a) preparing an in-situ, three-dimensional treatment cell at a location remote from said surface conditions,
      wherein said treatment cell comprises a surface area, at least one injection well surrounding by a plurality of associated extraction wells less than 300 feet from each associated injection well, and a treatment zone,
      wherein said treatment cell surface area is smaller than said plume surface area,
      wherein each injection well comprises an outlet in hydraulic connection with a local water table,
      wherein each extraction well comprises an inlet in hydraulic connection with said local water table, and a pump, and
      wherein said treatment zone comprises reagent, and is located in said local water table between said injection well and associated extraction wells,
   (b) inserting at least one pumping well into said plume, wherein said pumping well comprises:
      an inlet in hydraulic connection with said contaminant plume,
      a pump,
      and an outlet connected with said plume surface area wherein said outlet is in hydraulic connection with said treatment cell,
   (c) pumping contaminated groundwater from said plume through said pumping well inlet, up said pumping well, through said hydraulic connection, to said remote treatment cell, and into at least one remote injection well, wherein said contaminated water flows out said injection well outlet into said treatment zone,
   (d) pumping treated water from each extraction well at a rate wherein said water is treated in one-pass through said treatment zone,
   (e) extracting said treated water from said extraction well and disposing of said water.

2. The method of claim 1 wherein said surface conditions are infrastructure.

3. The method of claim 1 wherein said surface conditions are geological.

4. The method of claim 1 wherein said reagent is long term.

5. The method of claim 4 wherein said long-term reagent is biological.

6. The method of claim 5 wherein said long-term biological reagent is emulsified edible oil.

7. The method of claim 4 wherein said long-term reagent is chemical.

8. The method of claim 1 wherein each injection wells is surrounding by a plurality of associated extraction wells in a grid pattern.

9. The method of claim 1 wherein each injection is surrounded by four associated extraction wells.

10. The method of claim 1 wherein said remote location for said treatment cell is cross-gradient from said plume.

11. The method of claim 1 wherein said remote location for said treatment cell is up-gradient from said plume.

12. The method of claim 1 wherein said remote location for said treatment cell is down-gradient from said plume.

13. The method of claim 1 wherein said treatment cell surface area is ¼ of said plume surface area.

14. The method of claim 1 wherein at least one pore volume of said contaminant plume is pumped to said treatment cell.

15. The method of claim 1 wherein said treatment zone surrounds said injection well outlet in an annular shape.

16. The method of claim 1 wherein an infiltration gallery disposes of said treated water.

17. A method for treating a large-scale contaminant plume under a surface area when surface conditions above said plume interfere with placement of a plurality of pumps at distances of less than 300 feet, wherein the improvement comprises:
   (a) preparing an in-situ, three-dimensional treatment cell at a location remote from said surface conditions,
      wherein said treatment cell comprises a surface area, at least one injection well, a plurality of extraction wells less than 300 feet from each injection well, a treatment zone, and a natural hydraulic gradient,
      wherein said treatment cell surface area is smaller than said plume surface area,
      wherein each injection well comprises an outlet in hydraulic connection with a local water table,
      wherein each extraction well comprises an inlet in hydraulic connection with said local water table, and
      wherein said treatment zone comprises reagent, and is located in said local water table between said injection well and associated extraction wells,
   (b) inserting at least one pumping well into said plume, wherein said pumping well comprises:
      an inlet in hydraulic connection with said contaminant plume,
      a pump,
      and an outlet connected with said plume surface area wherein said outlet is in hydraulic connection with said treatment cell,
   (c) pumping contaminated groundwater from said plume through said pumping well inlet, up said pumping well, through said hydraulic connection, to said remote treatment cell, and into at least one remote injection well, wherein said contaminated water flows out said injection well outlet through said treatment zone due to said natural hydraulic gradient for treatment,
   (d) extracting treated water from said extraction well and disposing of said water.

* * * * *